United States Patent [19]

Gradoni et al.

[11] 4,140,014
[45] Feb. 20, 1979

[54] LAGGED DRIVE WHEELS

[75] Inventors: Donald B. Gradoni, Latham; Stephen S. Dombrosky, Petersburg, both of N.Y.

[73] Assignee: Albany International Corp., Albany, N.Y.

[21] Appl. No.: 812,162

[22] Filed: Jul. 1, 1977

[51] Int. Cl.² .............................................. F16H 55/38
[52] U.S. Cl. ...................................... 74/230.7; 74/215; 198/835
[58] Field of Search ............... 198/835, 780, 842, 843, 198/847; 74/214, 215, 216, 230.5, 229, 230.7; 193/35 R, 37; 29/115, 120

[56] References Cited

U.S. PATENT DOCUMENTS

| | | | |
|---|---|---|---|
| 1,421,231 | 6/1922 | Henninger | 74/215 |
| 1,559,785 | 11/1925 | Russell | 29/120 |
| 2,894,744 | 7/1959 | Schulze | 193/37 |
| 2,941,410 | 6/1960 | Ota | 198/835 |
| 3,224,566 | 12/1965 | Elliott | 198/847 |
| 3,620,897 | 11/1971 | Tanimoto et al. | 198/847 |

FOREIGN PATENT DOCUMENTS 201207 10/1967 U.S.S.R. .................... 198/835

Primary Examiner—Robert B. Reeves
Assistant Examiner—Richard K. Thomson
Attorney, Agent, or Firm—Kane, Dalsimer, Kane, Sullivan and Kurucz

[57] ABSTRACT

The disclosure is of a friction drive wheel of the type employed for driving continuous conveyor belts. The wheel is lagged with a textile fabric which comprises a base of woven polyester yarn and a friction surface of polyester textile fibers needled to the base. The lagged wheels of the invention exhibit enhanced durability over prior art frictional drive wheels, reducing the down time of conveyor units incorporating them. In comparison to asbestos lagged drive wheels there is also a reduction of potential health hazards to operating personnel as will be appreciated by industrial health personnel.

3 Claims, 3 Drawing Figures

LAGGED DRIVE WHEELS

BACKGROUND OF THE INVENTION

1. Field of the Invention

The invention relates to frictional drive wheels and more particularly relates to lagged drive wheels employed for frictionally driving conveyor belts of the continuous belt type.

2. Brief Description of the Prior Art

Prior hereto frictional drive wheels have been lagged with asbestos, rubber and cotton to provide a frictional surface. In general, the prior art lagged drive wheels have a limited durability and period of usefulness. The lagging, which is subject to abrasive wear, requires fairly frequent replacement. In contradistinction, the frictional drive wheels of the present invention have enhanced durability in comparison to the prior art drive wheels. Accordingly, the drive wheels of the present invention require less frequent replacement and therefore advantageously reduce the down time of the apparatus incorporating them as drive wheel components. This provides for more efficient overall operations. The term "down time" refers to the period of time continuous belt apparatus is inoperative for repair and maintenance.

The drive wheels of the invention are also advantageous over wheels lagged with asbestos, the latter posing a health hazard to operating personnel as asbestos fibers abrade free of the wheel to be carried in the air.

SUMMARY OF THE INVENTION

The invention comprises a friction drive wheel, which comprises;
(A) A wheel having a hub, a felly and means for supporting said felly on the hub; and
(B) A traction surface member mounted on the outer periphery of said felly, said member comprising,
 (i) a base of woven polyester yarn; and
 (ii) a friction surface of polyester fibers needled to said base.

BRIEF DESCRIPTION OF THE PREFERRED EMBODIMENT OF THE INVENTION

Figure 1:
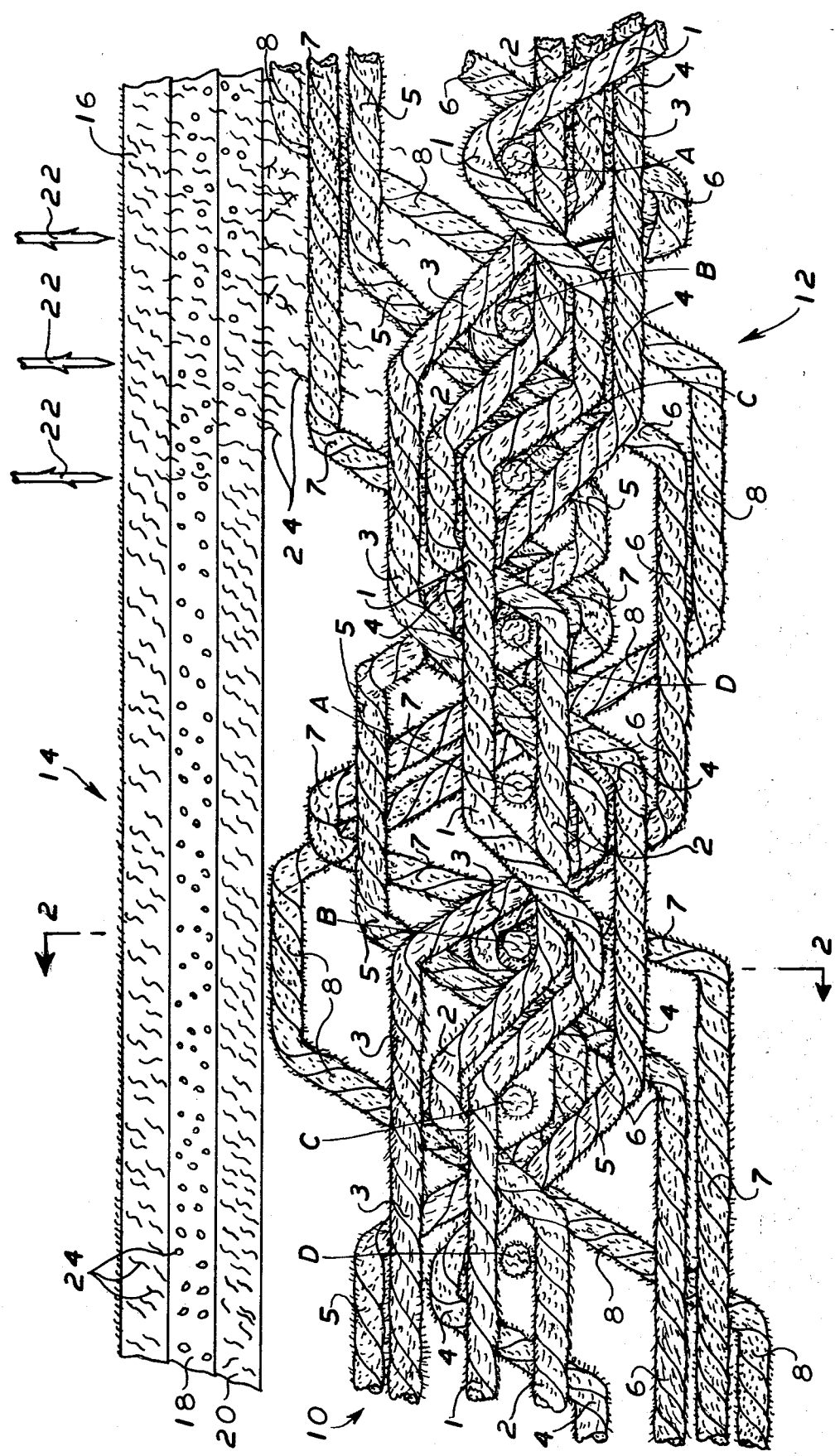
FIG. 1 is a cross sectional, exploded, side elevation of a portion of a preferred traction surface member component for the drive wheels of the invention.
Figure 3:
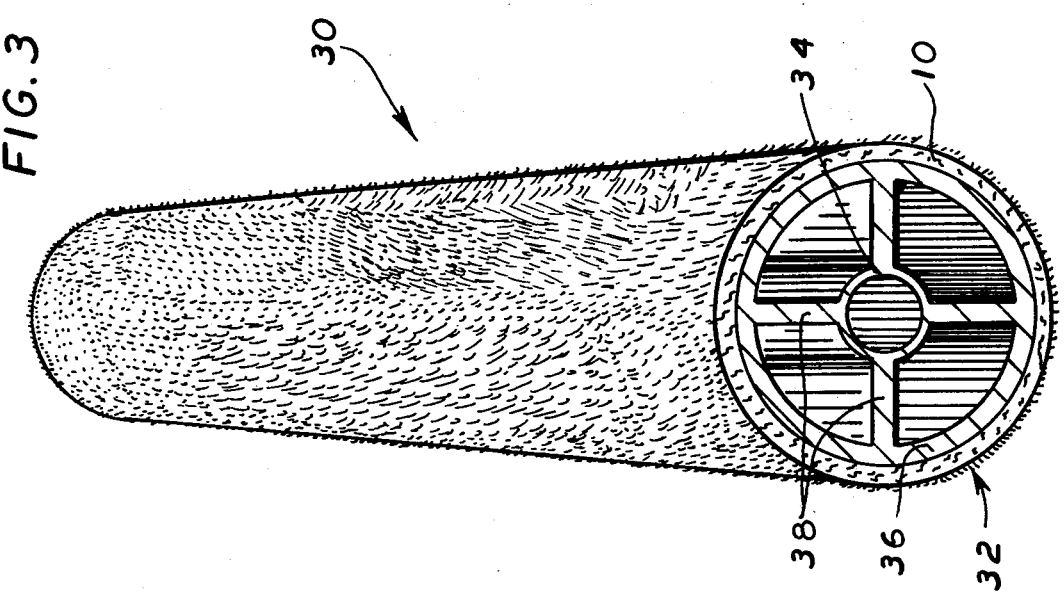
FIG. 3 is an isometric view of a friction drive wheel embodiment of the invention.
Figure 2:
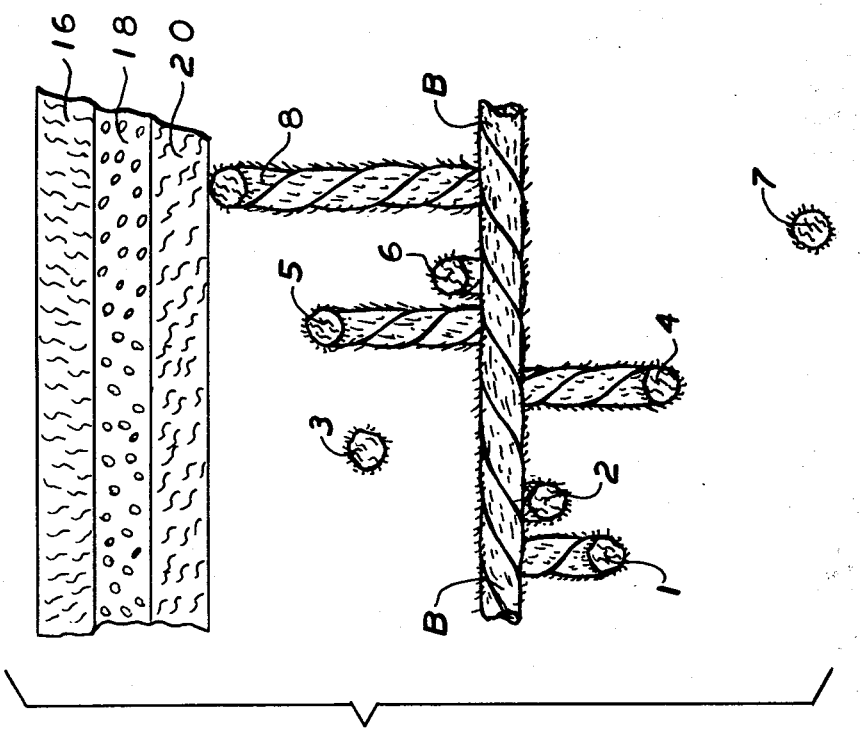
FIG. 2 is a view along lines 2—2 of FIG. 1.

A complete understanding of the invention may be conveniently obtained by a reading of the following description in conjunction with the accompanying drawings of FIGS. 1-3, inclusive.

FIG. 3 is an isometric view of an embodiment frictional drive wheel 30 of the invention and shows the embodiment as comprising a hub 34 for mounting on a conventional drive means (not shown in FIG. 3) and a rim or felly 36 supported on the hub 34 by a plurality of spokes 38. The spokes 38 comprise a means of supporting felly 36 on hub 34. Other means of support such as a solid disc may be employed.

Mounted on felly 36 is a traction surface member 32 which comprises preferred fabric 10, which will be described more fully hereinafter. The wheel 30 may be employed to support and drive a conventional conveyor belt of the endless type in conjunction with a plurality of similar wheels 30 as will be appreciated by those skilled in the art. In operation, the hub 34 is engaged by a driving means and wheel 30 transmits the driving power to an endless belt brought in contact with the traction surface member 32 as is well known.

Traction surface member 32 is a textile fabric mounted on felly 36 by frictional engagement or preferably adhesive means. The textile fabric which comprises traction surface member 32 itself comprises a base of woven polyester yarns to which there is needled as a top or frictional surface a web of polyester staple fibers. The use of synthetic polyester yarns and fibers to fabricate the member 32 is particularly advantageous because of their resistance to degradation by moisture and high temperatures. Polyester yarns and fibers also enhance the durability of member 32 in comparison to other polymeric yarns and fibers. Representative of synthetic polyester yarns and fibers which may be used to construct the traction surface member 32 are yarns of polyethylene terephthalate and the like. The base of woven polyester yarns may be a simple, single layer weave. Of course, more complex weaves such as duplex and other multi-layer weaves and the like may also be used as the base of traction surface member 32. The base of woven polyester yarns functions to provide dimensional stability and strength to the member 32. Accordingly, those skilled in the art will appreciate the wide variety of weaves which may be employed to meet specific demands of strength and/or stability in member 32. Advantageously, the staple polyester fibers needled into the upper surface of the woven base may be provided in a web of polyester fibers. Such webs are well known and may comprise randomly dispersed or oriented individual fibrous filaments, preferably having a fiber length of at least 1½ inches. The fibrous components of the fabric employed as member 32 preferably comprise between 8 and 28 percent of the total polyester content of the fabric structure.

As stated above, the fabric comprises surface member 32 is produced by needling a web or webs of substantially untwisted polyester staple fibers into the woven base structure leaving a frictional surface. Apparatus and techniques for accomplishing such needling are well known to those skilled in the art; see for example the disclosure of U.S. Pat. No. 3,684,284. Advantageously, in needling, the barbed felting needles enter from the side of the unconsolidated web or webs of polyester fibers to enter and penetrate through the woven base. This needling operation carries individual fibers of the unconsolidated web downwardly through the woven base structure to firmly interlock the individual polyester fibers with the woven yarns. The needling operation also consolidates the web or webs of oriented or random polyester fibers to compact, interlock and consolidate the individual fibers and web or webs. This leaves a durable but frictional surface above the base woven structure. The specific characteristics of the frictional surface may be varied by selection of the sizes of felting needles, density of needles on the loom and number of passes made on the needle loom, as is known in the art.

Following needling, the needled, composite fabric may be washed and scoured, smoothed and dried prior to being cut and mounted on the felly 36. If desired the fabric may also be chemically treated to obtain any desired finish or property.

Referring now to FIG. 1, a cross sectional side elevation, a portion of preferred fabric 10 is seen. Fabric 10 provides for a preferred traction surface member 32. The specific structure of fabric 10 provides bulk, compressibility and advantageous frictional surface properties for the member 32. For the purpose of illustration the relative thicknesses of component parts seen in the FIG. 1, showing various stages of production of the composite structure, have not been reproduced in the drawing. The relative dimension of the yarns has been exploded and they have been separated so as to simplify visualization. As shown in FIG. 1, the base 12 of fabric 10 is a multi-layer weave which may be carried out on any conventional weaving loom. The warp yarns of spun polyester numbered 1–8, inclusive, are woven in the numbered sequence 1 to 8 and interwoven with fill yarns labeled A–D, inclusive. The fill yarns are woven sequentially in the repeating sequence A to D as shown. In the preferred fabric 10, the frictional surface component 14 comprises 3 layers or webs 16, 18 and 20 of polyester staple fibers 24 which are needled to woven base 12 by barbed felting needles 22. As shown in FIG. 1, the fibers 24 in adjacent webs 16, 18 and adjacent webs 18, 20 are advantageously oriented in different directions to assure heterogenicity in the final friction surface member 32. For the purpose of clarity, only a few fibers 24 are shown in FIG. 1 as displaced from webs 16, 18 and 20 by needling. It will be appreciated by those skilled in the art that needling will displace a substantial proportion of the fibers 24 so that they engage with and interlock with each other among the layers 16, 18 and 20 and they also interlock with the spun yarns 1–8 and A–D so that a unitary, compact and integral structure is obtained in the fabric 10. Further details of the basic structure of fabric 10 may be seen in the exploded view offered by FIG. 2, a view along lines 2—2 of FIG. 1. For purposes of illustration and clarity, FIG. 2 does not show the interlocking of fibers 24 with themselves and the spun woven yarns of the woven base structure.

The following example describes the manner and process of making and using the invention and sets forth the best mode contemplated by the inventor of carrying out the invention but is not to be construed as limiting.

EXAMPLE

A woven fabric is provided which comprises a two layer weave as shown in FIG. 1, supra., of 100 percent spun polyester yarn (Dacron, DuPont). The weave comprises 28 warp yarns and 13 filling yarns per inch, each yarn weighing 1,000 grains per 100 yards. To this woven fabric there is needled on one side, three layers of 12 denier polyester fibers (Dacron, DuPont) to achieve a fabric with a caliper of from 0.170 to 0.185 inches. Needling was accomplished with a single pass on a needling loom.

The composite fabric obtained was scoured with boiling water and allowed to dry. The dried fabric was then singed to remove protruding fibers from the back side or base side of the fabric. A representative portion of the fabric so prepared was then cut and adhesively mounted on the felly of a drive wheel as lagging. The drive wheel was mounted on a conveyor apparatus carrying an endless elastomeric belt. Other drive wheels were provided on the same apparatus, lagged with rubber, asbestos or cotton. After a period of operation, it was obvious that the drive wheel of the invention showed enhanced durability of its frictional surface in comparison to other drive wheels on the same apparatus which were lagged with rubber, asbestos or cotton cloth.

What is claimed is:

1. A friction drive wheel which comprises;
   (a) a wheel having a hub, a felly and means for supporting said felly on the hub; and
   (b) a traction surface member mounted on the outer periphery of said felly, for driving an endless belt, said member comprising,
     (i) a base of woven polyester yarn; and
     (ii) a friction drive surface of polyester fibers needled to said base, said fibers being oriented in different directions to achieve heterogenicity in the drive surface of said member.

2. The wheel of claim 1 wherein said means for supporting comprises a plurality of spokes.

3. The wheel of claim 1 wherein said polyester yarns are spun in a multi-layer weave.

* * * * *